(12) United States Patent
Moberg

(10) Patent No.: US 11,974,560 B2
(45) Date of Patent: May 7, 2024

(54) FISHING HOOK HOLDER FOR RETAINING, STORING, AND RAPIDLY DISPENSING A FISHING HOOK

(71) Applicant: Jeremiah Stephen Moberg, Jacksonville, FL (US)

(72) Inventor: Jeremiah Stephen Moberg, Jacksonville, FL (US)

( * ) Notice: Subject to any disclaimer, the term of this patent is extended or adjusted under 35 U.S.C. 154(b) by 78 days.

(21) Appl. No.: 17/941,476

(22) Filed: Sep. 9, 2022

(65) Prior Publication Data
US 2023/0092088 A1 Mar. 23, 2023

Related U.S. Application Data

(60) Provisional application No. 63/247,535, filed on Sep. 23, 2021.

(51) Int. Cl.
*A01K 7/06* (2006.01)
*A01K 97/06* (2006.01)

(52) U.S. Cl.
CPC .................... *A01K 97/06* (2013.01)

(58) Field of Classification Search
CPC ...................................... A01K 97/06
See application file for complete search history.

(56) References Cited

U.S. PATENT DOCUMENTS

| | | | | |
|---|---|---|---|---|
| 1,737,376 A | * | 11/1929 | Knettles | A01K 97/06 43/57.2 |
| 2,791,863 A | * | 5/1957 | Sweeney | A01K 97/06 43/57.2 |
| 4,040,202 A | * | 8/1977 | Wille | A01K 97/06 D3/905 |
| 4,326,630 A | * | 4/1982 | Bacino | A61B 17/06133 206/315.11 |
| 4,514,928 A | * | 5/1985 | Hanson | B65H 75/18 43/57.2 |
| 5,386,662 A | * | 2/1995 | Vader | A01K 97/06 206/315.11 |
| 5,787,635 A | * | 8/1998 | Lin | A01K 97/06 43/57.1 |
| 5,815,979 A | * | 10/1998 | George | A01K 97/06 43/57.2 |

(Continued)

OTHER PUBLICATIONS

Knife Holder-Prenaspire (Year: 2020).*

*Primary Examiner* — Richard G Davis
(74) *Attorney, Agent, or Firm* — Derek Fahey; The Plus IP Firm, PLLC

(57) ABSTRACT

A fishing hook holder for retaining, storing, and rapidly dispensing a fishing hook is disclosed. The fishing hook holder comprises a base, a plurality of slats spaced apart from each other disposed on a first side of the base, a gap formed between adjacent slats of the plurality of slats, and a biasing element disposed proximate to the plurality of slats. A backstop is disposed proximate to the biasing element. The fishing hook holder comprises a cover positioned above the biasing element and in attachment with the first side of the base. The fishing hook holder further comprises a sharp edge for cutting an object. A portion of a fishing hook is sandwiched by at least one resilient element and an interior portion of a third side opening, and a barb on the fishing hook is received by a fourth side opening on a fourth side of the base.

20 Claims, 16 Drawing Sheets

(56) References Cited

U.S. PATENT DOCUMENTS

| | | | | |
|---|---|---|---|---|
| 6,533,151 B1* | 3/2003 | Link | .................. | A45F 5/00 |
| | | | | 248/312.1 |
| 2008/0110078 A1* | 5/2008 | Kuhn | .................. | A01K 97/06 |
| | | | | 43/57.1 |
| 2008/0203207 A1* | 8/2008 | Krauland | ............ | A01K 89/003 |
| | | | | 242/287 |
| 2010/0269400 A1* | 10/2010 | Gesik | .................. | A01K 97/06 |
| | | | | 43/57.1 |
| 2018/0055029 A1* | 3/2018 | Webb | .................. | A01K 97/06 |

\* cited by examiner

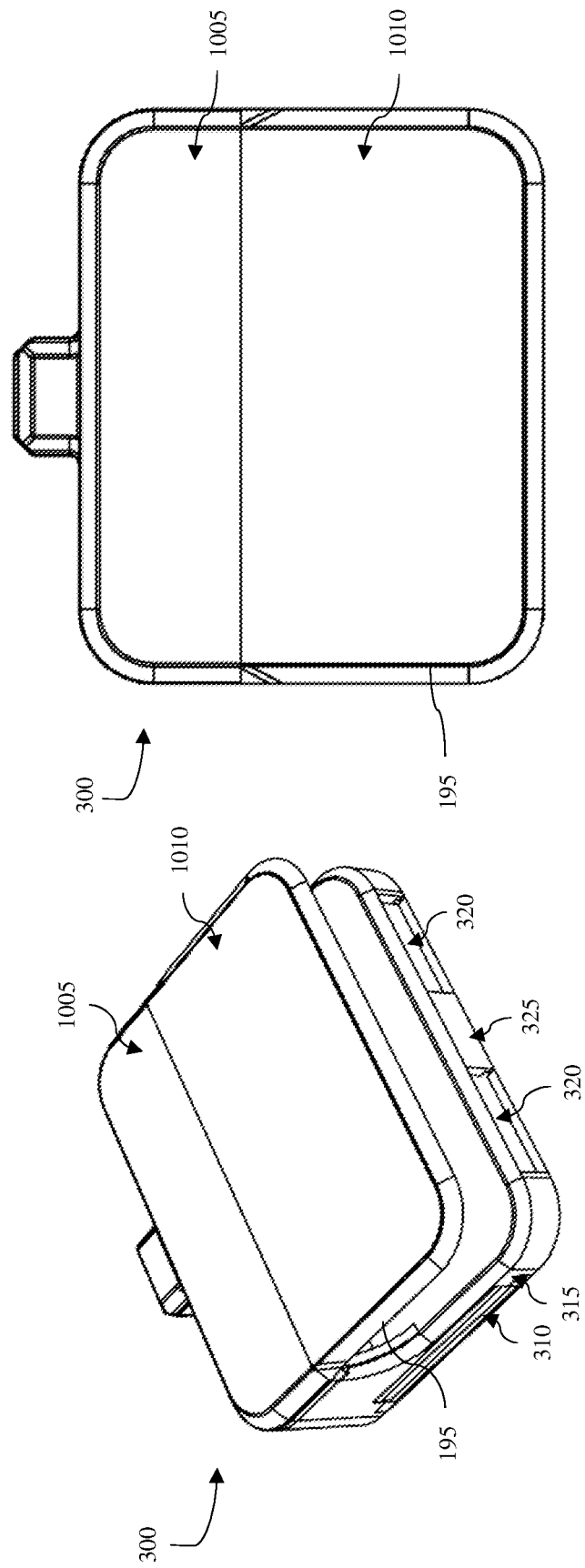

FISHING HOOK HOLDER FOR RETAINING, STORING, AND RAPIDLY DISPENSING A FISHING HOOK

CROSS-REFERENCE TO RELATED APPLICATIONS

This application claims the benefit of the filing date of U.S. Provisional Application Ser. No. 63/247,535 titled "FISHING HOOK HOLDER FOR RETAINING, STORING, AND RAPIDLY DISPENSING A FISHING HOOK" and filed Sep. 23, 2021, and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of fishing, and more specifically to the field of fishermen's accessories and tackle storage devices.

BACKGROUND

Storing fishing hooks is essential for fisherman because fisherman often snap their fishing lines while fighting fish or snagging the lure in weeds or on tree roots. The most common method of storing fishing hooks is in tackle boxes. However, tackle boxes can be very inconvenient and ineffective because fishing hooks often get intertwined when stored within a single compartment. Additionally, different types of fishing hooks commingle within the tackle boxes because each individual fishing hook is not securely organized. The inorganization leads to fishermen being frequently poked when trying to retrieve the disarranged fishing hooks from the compartments of a tackle box.

The prior art fails to provide both an easy and secure means of depositing, storing, and removing fishing hooks from its holder. Certain prior art secures the fishing hook by the curvature of the hook requiring the fisherman to grasp the barb to insert and remove the hook into place. Additionally, the prior art often leaves the barb of the fishing hook exposed which may result in injury to the fisherman. Certain prior art, such as U.S. Pat. No. 2,659,997, does not provide an easy storage technique for secure storage of fishing hooks because it attaches the fishing hook and lead line to the parts of the storage device. Not only does the technique disclosed in U.S. Pat. No. 2,659,997 take extra steps to securing fishing hooks into storage, but the hooks also lack organization causing lines to be tangled. Additionally, many of the prior art are oriented towards a specific size fishing hook or tackle, leaving the fisherman to purchase numerous organization and holder tools. By having numerous organizers for fishing hooks, the fisherman is unfortunately left with the reverting back to storing the holders in a tackle box, which can be bulky and inconvenient to maneuver through fishing environments.

In addition to a failure to provide both an easy and secure storage device, the prior art lacks portability. A fisherman requires a storing device for fishing hooks that can be attached to numerous surfaces and locations depending on where the fisherman is fishing and the fisherman's needs. For example, the fisherman may be on a boat, standing on the bank of a lake, or wadding in a river. Each situation may prevent the use of a tacklebox given that the fisherman will not be able to easily store the tackle box while at those locations.

As a result, there exists a need for improvements over the prior art and more particularly for a more efficient way of storing, organizing, and retrieving fishing hooks from a storage device.

SUMMARY

An apparatus, system, and method for retaining, storing, and rapidly dispensing a fishing hook is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for retaining, storing, and rapidly dispensing a fishing hook is disclosed. The system is a fishing hook holder that comprises a base, a plurality of slats spaced apart from each other disposed on a first side of the base, a gap formed between adjacent slats of the plurality of slats, and a biasing element disposed proximate to the plurality of slats. A backstop is disposed proximate to the biasing element. The plurality of slats is disposed in a first direction. The biasing element further comprises a plurality of coil windings configured to bias towards each other, a channel within the biasing element having a channel diameter, and a second gap between adjacent coil windings of the plurality of coil windings. The second gap has a second gap diameter smaller than a shank diameter of a shank of the fishing hook. The system further comprises a first fastener at a first end of the biasing element and a second fastener at a second end of the biasing element. The first fastener and the second fastener attach the biasing element to the first side of the base and proximate to the plurality of slats. The system comprises a cover positioned above the biasing element and in attachment with the first side of the base. The cover extends over a substantial portion of the first side. The system comprises an attachment element in attachment with a second side of the base and configured for attaching the system to at least one of an article of clothing, a fishing rod, and a portion of a boat. The system further comprises at least one resilient element disposed in a third side opening on a third side of the base and a fourth side opening on a fourth side of the base such that a portion of the fishing hook is sandwiched by the at least one resilient element and an interior portion of the third side opening, and a barb on the fishing hook is received by the fourth side opening. The system further comprises a sharp edge for cutting an object.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIG. 10A is a front perspective view of the fishing hook holder, according to the first example embodiment;

FIG. 10B is a front view of the fishing hook holder having a cover, according to the first example embodiment;

Like reference numerals refer to like parts throughout the various views of the drawings. The figures are drawn to scale.

DETAILED DESCRIPTION

Figure 1A:
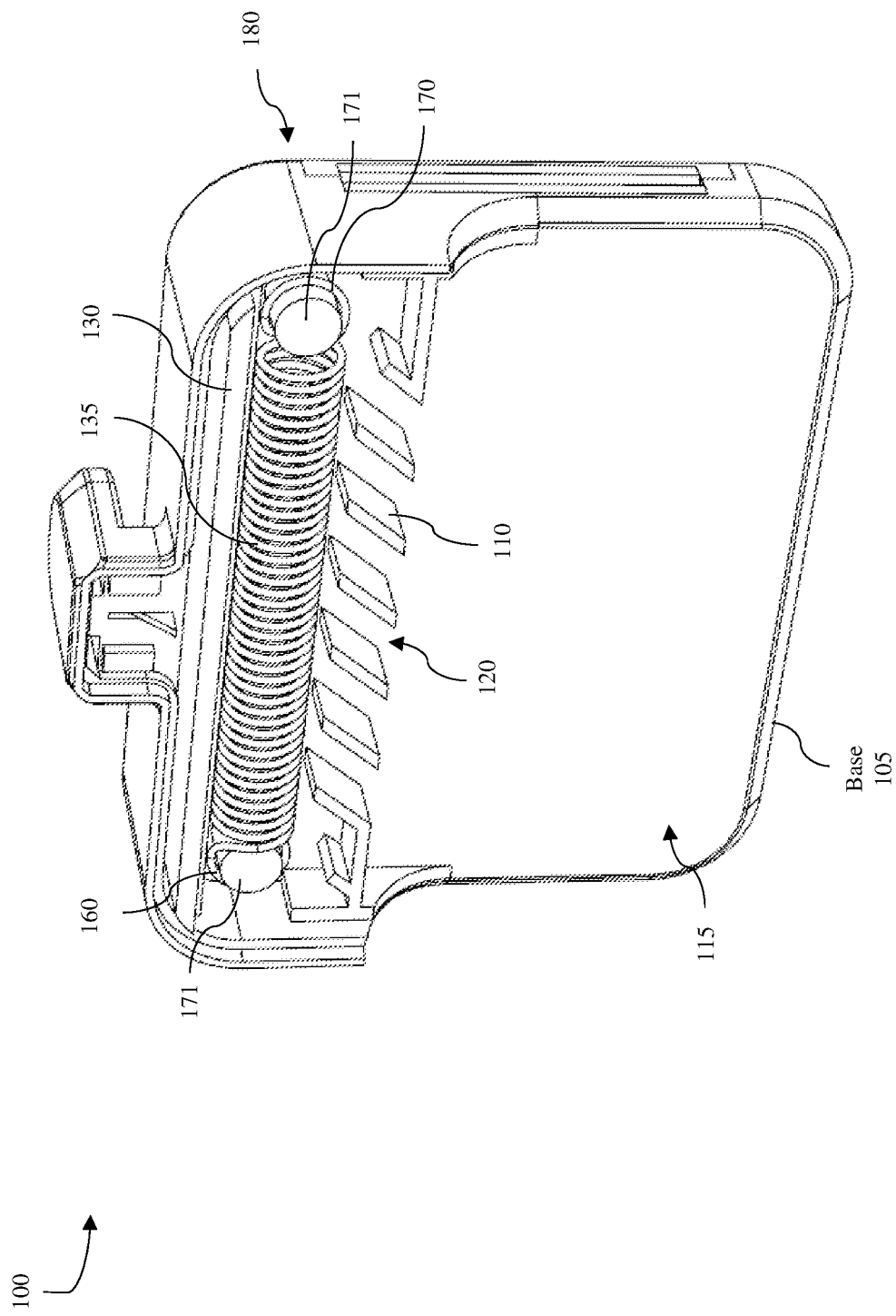
FIG. 1A is a perspective view of the fishing hook holder without the cover, according to a first example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system for storing, organizing, and retrieving fishing hooks from a storage device. The system allows for effortless and secure organization of fishing hooks by configuring angled slats, a biasing element, and a backstop to separately secure fishing tackle into place. The biasing element is disposed between the slats and the backstop. When a shank of the fishing hook is inserted through a gap of two slats, the backstop holds the spring in place for an eye of the fishing hook to slide in between the coil windings of the biasing element. A cover in attachment to the base shields a substantial portion of the fishing hook holder in order to further secure the fishing hooks in the gaps. The fishing hook holder improves over the prior art because it provides a fast and secure means of retrieving and storing tackle while fishing. The sharp edge of the fishing hook holder provides the user with a convenient means of cutting the line of a fishing pole. Additionally, an attachment element enables the fishing hook holder to be portable, thereby improving over the prior art.

Figure 1B:
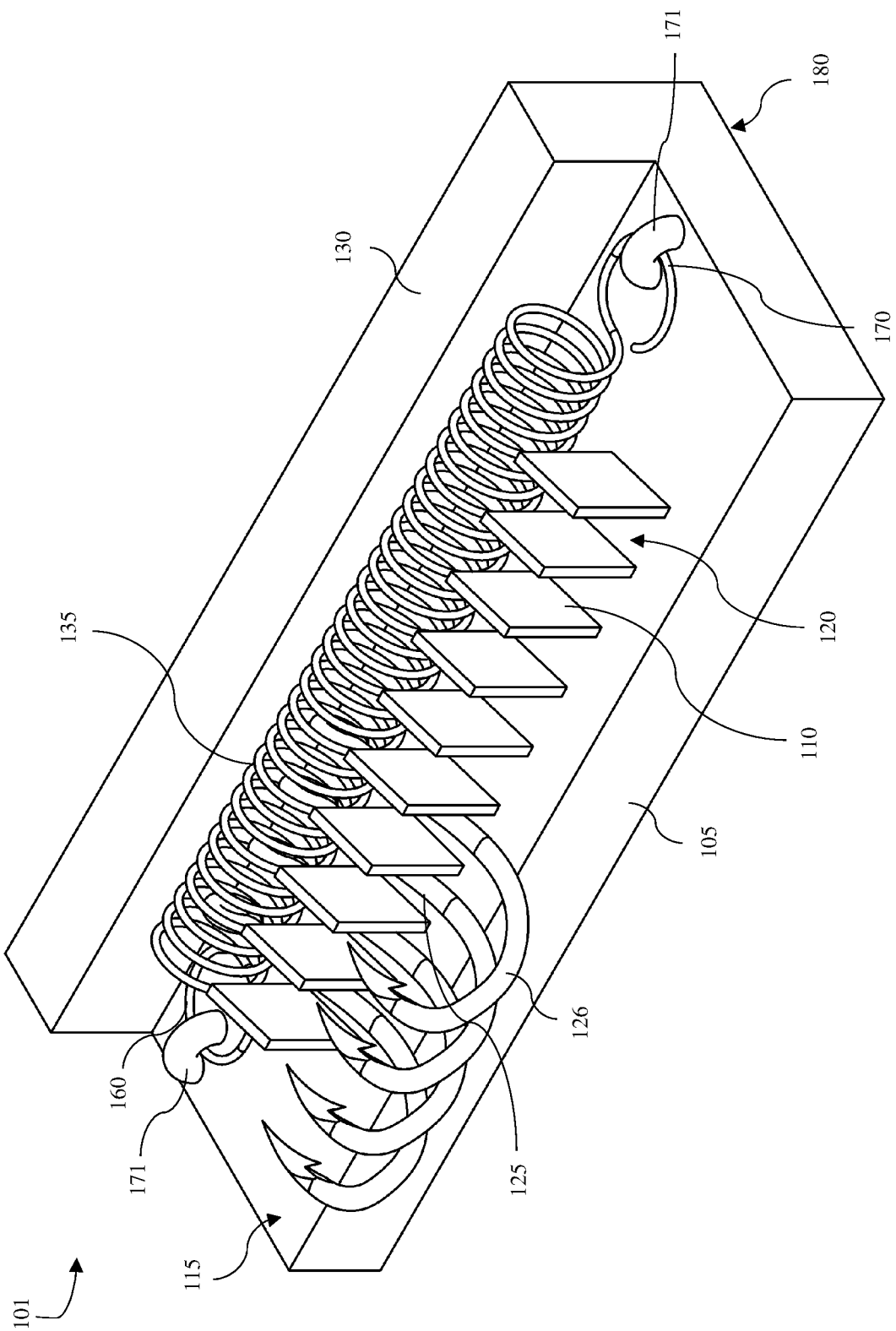
FIG. 1B is a perspective view of the fishing hook holder without the cover, according to a second example embodiment.
Figure 1C:
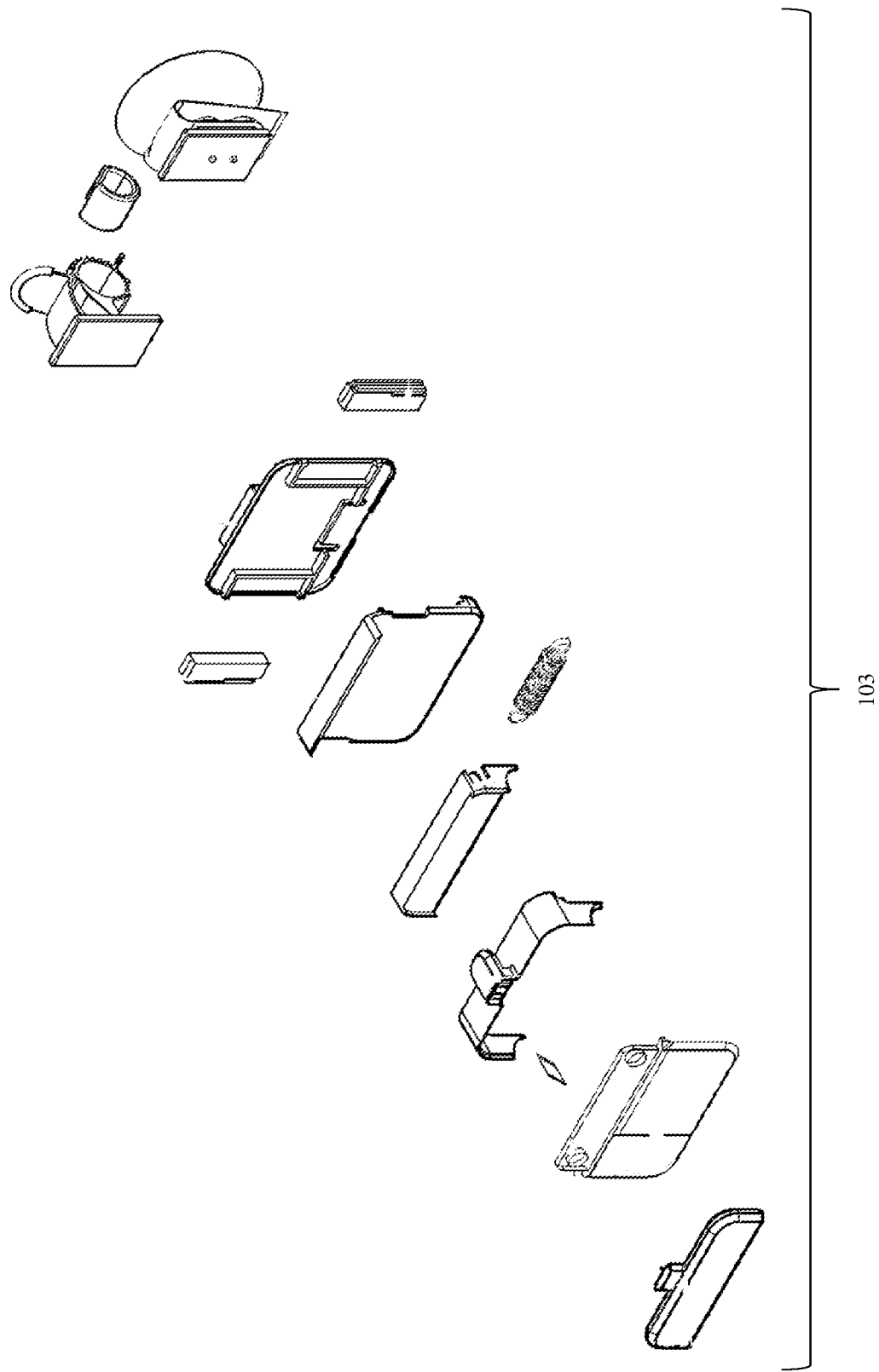
FIG. 1C is an exploded perspective view of the fishing hook holder, according to the first example embodiment.

Referring now to the Figures, FIGS. 1A and 1C are perspective views of the fishing hook holder, according to example embodiments. FIG. 1A illustrates a first example embodiment 100 without a fishing hook, and FIG. 1B illustrates a second example embodiment 101 with fishing hooks. FIG. 1C is an exploded view of the fishing hook holder 103 including the cover, according to an example embodiment. As shown in FIG. 1C, it is understood that the elements and parts described herein may be comprised of and/or formed from a single piece or from several individual pieces joined or coupled together, which in turn may be formed from one or more manufacturing processes comprised of a variety of materials consistent with this disclosure. The fishing hook holder includes a base 105 and a plurality of slats 110 spaced apart from each other disposed on a first side of the base. A gap is formed between adjacent slats of the plurality of slats. A biasing element is disposed proximate to the plurality of slats, and a backstop is disposed proximate to the biasing element. The plurality of slats is disposed in a first direction. The biasing element further includes a plurality of coil windings configured to bias towards each other, a channel within the biasing element having a channel diameter, and a second gap between adjacent coil windings of the plurality of coil windings. The second gap has a second gap diameter smaller than a shank diameter of the shank of the fishing hook.

The fishing hook holder is configured to provide a system for storing, organizing, and retrieving fishing hooks from a storage device. The system is configured for retaining, storing, and rapidly dispensing an elongated item, which, in the present embodiment, is a fishing hook. However, in other embodiments, other elongated items may be stored, organized, and dispensed from the system. The fishing hook holder may receive any type of fishing hook or tackle having a fishing hook, including bait hooks, J hooks, circle hooks, worm hooks, jig hooks, and siwash hooks. The fishing hook holder can secure tackle having an eye of a fishing hook. An eye of a fishing hook is defined as the circular hole at the end of the shank where the fisherman connects the hook to the line. The biasing element of the fishing hook holder receives the eye of the fishing hook within a channel of the biasing element and exerts a force onto the fishing hook or tackle to secure it in place. Specifically, the biasing element may exert a force on an upper portion of the fishing hook including the eye and the shank of the fishing hook. In certain embodiments, depending on the dimensions of the fishing hook, the biasing element 135 exerts a force onto the shank 125 of the fishing hook, which is the upper portion of the fishing hook in attachment with the eye of the fishing hook. Other types of tackle are within the spirit and scope of the disclosure and can be stored, organized, and retrieved using the fishing hook holder.

The base 105 may include material such as carbon steel, stainless steel, aluminum, Titanium, other metals or alloys, composites, ceramics, polymeric materials such as polycarbonates like Acrylonitrile butadiene styrene (ABS plastic), Lexan™, and Makrolon™. The base may be made of other materials and is within the spirit and the disclosure. The base may be formed from a single piece or from several individual pieces joined or coupled together. The components of the base may be manufactured from a variety of different processes including an extrusion process, a mold, welding, shearing, punching welding, folding etc. However, other types of processes may also be used and are within the spirit and scope of the present invention. The first side and second side of the base may be flat while the upper portion of the base is configured to be in attachment with the backstop.

The slats 110 may include carbon steel, stainless steel, aluminum, Titanium, other metals or alloys, composites, ceramics, polymeric materials such as polycarbonates like Acrylonitrile butadiene styrene (ABS plastic), Lexan™, and Makrolon™. The slats may be made of other materials and is within the spirit and the disclosure. The components of the slats may be manufactured from a variety of different processes including an extrusion process, a mold, welding, shearing, punching welding, folding etc. However, other types of processes may also be used and are within the spirit and scope of the present invention. The slats may be concave towards the first direction or straight, and the edges of the slats may be curved or straight. The slats extend upward on the first side of the base and are spaced apart to form the first gaps. The slats may be merged with the base during the process of creating the base or in attachment with the base as a separate entity. The gaps of adjacent slats may be wide enough to allow for the shanks of the fishing hooks to be inserted through. The length of the slats may be at least as long as the shank of the fishing hooks and having a height protruding from the first side of the base configured to prevent the fishing hook from translating over the slat into an adjacent gap. In certain embodiments, the height of the slat is at least as great as the thickness of the tackle. In other embodiments, the height of the slats may correspond to the channel diameter.

The biasing element 135 is in attachment with the first side of the base and is positioned in between the slats and the backstop. The biasing element is defined by a plurality of biasing element portions 140 that are a plurality of coil windings of an expansion spring. The biasing element portion continuously bias towards each other to create tension. The biasing element is an expansion spring that has tightly wrapped coil windings that create tension and has hooks at both ends. The coil windings include a channel in which the fishing hooks are inserted into. The spring is secured by two hooks 160, 170 in attachment to the two ends of the base. In one embodiment a fastener 171 having an opening attached each of the hooks to the base. The fasteners exert a tensile force on the spring to extend the spring and open spaces between the coil windings, which form the second gaps 155. The second gaps are configured to receive the eye of the fishing hook when the fishing hook is inserted into the first gaps 120. The first gaps, formed by the slats, guide the shank of the fishing hook into the second gaps such that the second gaps are aligned proximate to the first gaps. To insert the fishing hooks or tackle into the second gaps, the channel diameter may be at least as long as the eye of the fishing hook, receive eye of hook or at least the diameter of the hook. The length of the second gaps is smaller than the shank diameter of the shank of the fishing hook such that the shank is squeezed by the coil windings of the biasing element. The thickness and tension of the coil windings, including the k-constant of the biasing element, may also be configured depending on the size and weight of fishing tackle. In one embodiment, the spring may be disposed on the top surface of the base such that the distance from the center of the channel of the spring to the bottom edge of the base is less than the total length of the fishing hook such that at least the bend of the fishing hook extends beyond the bottom edge of the base. This allows the fisherman to easily grasp the bend of the fishing hook to remove it from the fishing hook holder allowing for rapid storing and dispensing of the tackle.

The backstop 130 may be made out of materials consistent with the base. The backstop may include carbon steel, stainless steel, aluminum, Titanium, other metals or alloys, composites, ceramics, polymeric materials such as polycarbonates like Acrylonitrile butadiene styrene (ABS plastic), Lexan™, and Makrolon™. The backstop may be made of other materials and is within the spirit and the disclosure. The components of the backstop may be manufactured from a variety of different processes including an extrusion process, a mold, welding, shearing, punching welding, folding etc. However, other types of processes may also be used and are within the spirit and scope of the present invention. The backstop may be any shape or size such that the base is configured to prevent the expansion spring from bending when a fishing hook is inserted through the slats and into the spring. The backstop may extend upward at least as long as the diameter of the coil windings of the spring.

Figure 2A:
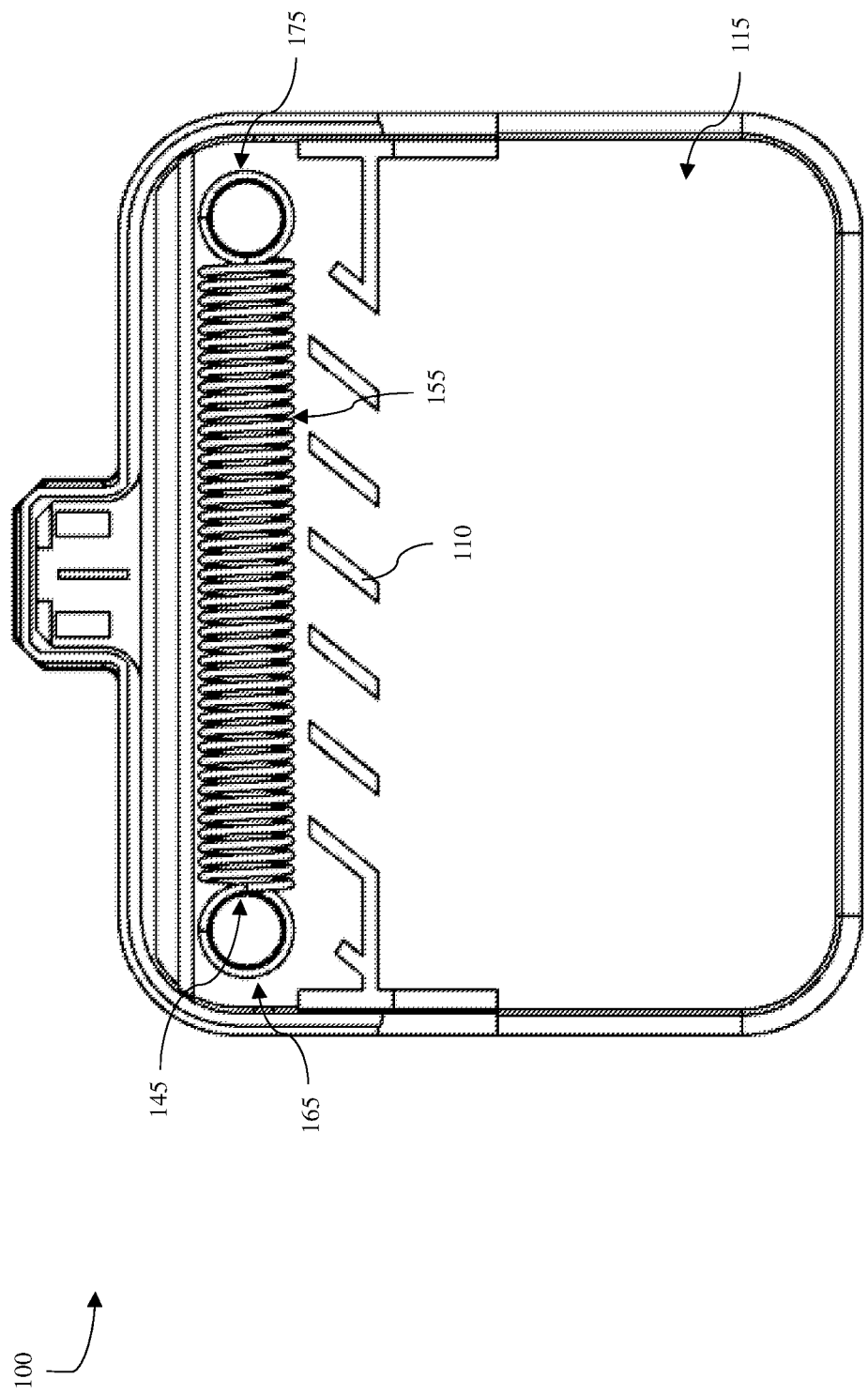
FIG. 2A is a front view of the fishing hook holder without the cover, according to the first example embodiment.
Figure 2B:
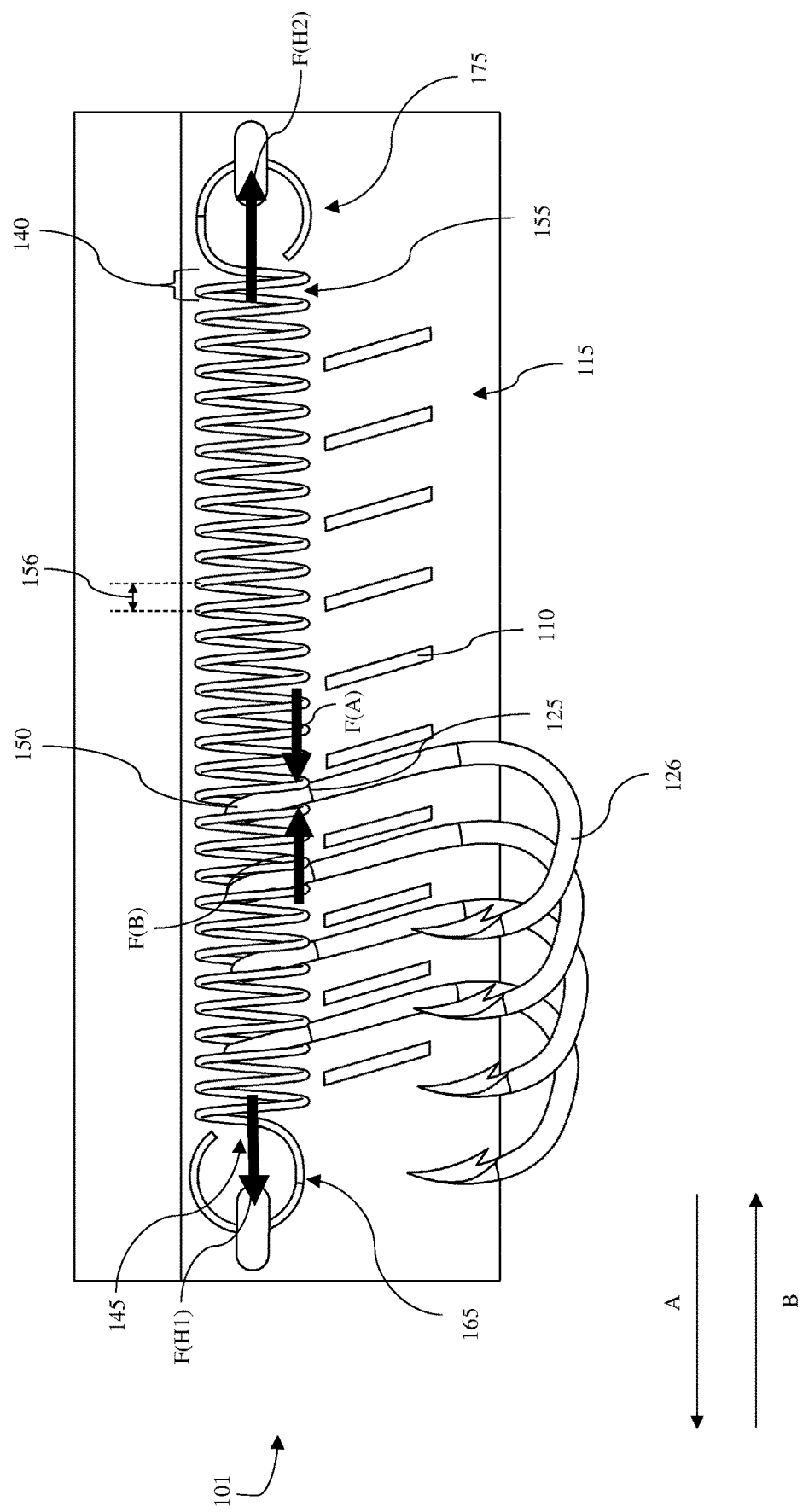
FIG. 2B is a front view of the fishing hook holder without the cover illustrating the forces acting on the fishing hook holder, according to the second example embodiment.
Figure 3B:
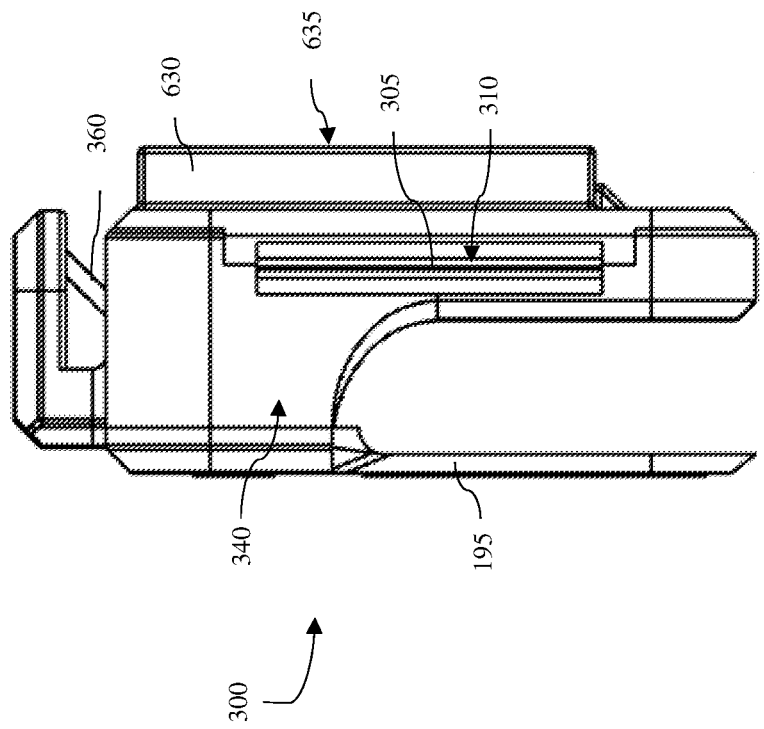
FIG. 3B is a right side view of the fishing hook holder, according to the first example embodiment.
Figure 3A:
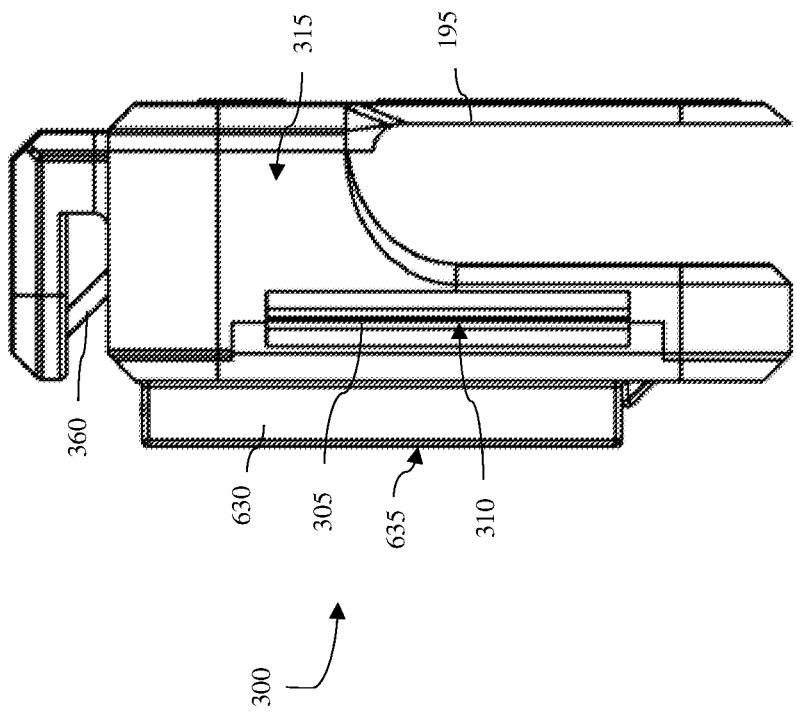
FIG. 3A is a left side view of the fishing hook holder, according to the first example embodiment.

Referring now to FIGS. 2A and 2B, a top view of the fishing hook holder 100 is shown, according to example embodiments. FIG. 2A illustrates the first example embodiment without the fishing hooks and FIG. 2B illustrates the second example embodiment with the fishing hooks. The biasing 135 includes a plurality of coil windings 140 configured to bias towards each other. The plurality of coil windings provides a first force (F(A) and F(B)) such that the coil windings bias towards each other. F(A) and F(B) act in opposite directions onto the shank 125 of the fishing hook 126 to hold the fishing hook in place. The expansion spring further includes a channel 145 defined by an opening inside the coil windings configured to receive an eye of the fishing hook 150. The expansion spring includes a plurality of second gaps 155 between the coiling windings. A second gap is defined by a spring pitch 156 of the expansion spring. The spring pitch is the distance between two adjacent coils, measured from the midpoint of the spring material. The first direction of the plurality of slats is configured to guide the eye of the fishing hook into the plurality of second gaps and into the channel of the expansion spring. Adjacent slats act as a guide for positioning the eye of the fishing hook into a corresponding second gap of biasing element and into the channel of the biasing element. Each of the gaps between the adjacent slats help a user of the fishing hook holder to position the eye of the fishing hook into corresponding second gaps. The fishing hooks positioned into the fishing hook holder are all oriented in the same direction. For example, in FIG. 2B, all the fishing hooks 126 are oriented in direction A such that the barbs are facing direction A. In other embodiments, the slats may be slanted in the opposite direction of the slants shown in FIG. 2B such that the fishing hooks are oriented in direction B, which would make the barbs of the fishing hooks face direction B. The biasing element exerts the first force on the shank of the fishing hook when the eye of the fishing hook is inside the channel of the expansion spring. The fishing hook holder further includes a first fastener 160 at a first end 165 of the expansion spring. The fishing hook holder further includes a second fastener 170 at a second end 175 of the expansion spring. The first fastener and the second fastener attach the biasing element to a fastener 171 to the first side 115 of base 105 and proximate to the plurality of slats 110 such that the coil windings are also orientated in the first direction. In one embodiment, the fastener is a semi-ring-shaped body that is attached to the base. However, other shapes may be used and are within the spirit and scope of the present invention.

The slats may be as tall as the diameter of the coil windings of the expansion spring. The slats are oriented in a first direction A to line up with the direction of the coil windings. In another embodiment, the slats and coil windings may be oriented in the direction B. Aligning the directions of the slats and coil windings allow the shank of the fishing hook to be inserted.

Because the spring is an expansion spring, the coil windings contain tension that brings them together. This creates the first force applied by the plurality of coil windings. The first force acts in two opposite directions parallel to the spring as shown by directions A and B. The strength of the force depends on the expansion springs tension, which is determined by the thickness of the coil of the spring. The thickness of the coil may be configured to create a strong enough force to hold the shank of the fishing hook. When the fishing hook is inserted into the channel, the first force acts on the upper portion of the shank of the fishing hook to get a secure hold on the fishing hook. The channel of the spring may be wide enough to hold at least the eye of the fishing hook.

The expansion spring also includes two curved hooks at a first end and second end of spring. The first hook, which is in attachment with the first side of the base, is at the first end of the spring. The first hook when attached to a fastener 171 provides the tensile force F(H1), oriented in direction A. The second hook when attached to a fastener 171 provides the tensile force F(H2), oriented in direction B. These tensile forces at the ends of the spring open the second gaps within the coil windings. The second gaps remain open because the hooks attached to the fastener causes enough forces to allow the expansion spring to remain open.

The fasteners may include carbon steel, stainless steel, aluminum, Titanium, other metals or alloys, composites, ceramics, polymeric materials such as polycarbonates like Acrylonitrile butadiene styrene (ABS plastic), Lexan™, and Makrolon™. The fasteners may be made of other materials and is within the spirit and the disclosure. The components of the fasteners may be manufactured from a variety of different processes including an extrusion process, a mold, welding, shearing, punching welding, folding etc. However, other types of processes may also be used and are within the spirit and scope of the present invention. The fasteners may include a suction cup, hooks, bolt, set screws, opening configured to attached to protruding element, socket screws, U-bolts, twine, etc. However, other types of fasteners may also be used and are within the spirit and scope of the present invention.

Referring now to FIGS. 3A-3B and 8-9, views of the fishing hook holder are illustrated, according to an example embodiment. The fishing hook holder includes a cover 195 positioned above the biasing element and in attachment with the first side of the base. The cover extends over a substantial portion of the first side. The cover 195 is in attachment with the base 105 configured to shield a substantial portion of the fishing hook holder. The cover acts as a shield because the cover has resilient properties that allow the cover to withstand the sharpness of the barbs of the fishing hooks and prevent the barbs from harming a user of the fishing hook holder or damaging other items. A substantial portion of the fishing hook holder means that the cover shields at least one of the components of the fishing holder, including at least one of the biasing elements, first hook, second hook, and the slats. The cover may also be configured to shield a substantial portion of the tackle such that at least the barb of the fishing hook is covered.

The fishing hook holder is also configured to hold a jig hook, which has an L-shaped shank, because it includes openings that receives the eye of a jig hook and the barb of the jig hook. Also shown in FIG. 10A, at least one resilient element 305 is disposed in a third side opening 310 on a third side 315 of the base. The third side opening includes a recess in which the at least one resilient element is disposed. The resilient element is configured to hold the eye of the jig hook against an interior portion of the third side opening such that a portion of the fishing hook is sandwiched by the at least one resilient element and an interior portion of the third side opening. A portion of the fishing hook includes the eye of the jig hook and part of the shank that is contiguous to the eye of the fishing hook. The interior portion is any side of the recess in the third side opening that is facing the resilient element. In some embodiments, the resilient element may be made of foam such that the foam squeezes the portion of the fishing hook against the interior portion of the third side opening. In other embodiments, the resilient element may include other materials configured to allow the resilient element to hold the portion of the fishing hook against the interior portion of the third side opening. Also shown in FIG. 10A, a fourth side opening 320 is on a fourth side 325 of the base and near the third side of the base such that a barb 1215 on the fishing hook is received by the fourth side opening. In the present embodiment, when the eye of a jig hook is wedged into the third side opening between the resilient element on the third side and the interior portion of the third side opening, the barb of the jig hook fits into the fourth side opening. Another fourth side opening may correspond with another third side opening 310, in which a resilient element is disposed, on a fifth side 340 of the base, shown in FIG. 3B.

The fishing hook holder further includes a sharp edge 360 for cutting an object. The sharp edge may be a blade or any flat edge configured to cut through other items or objects. The sharp edge is convenient for a fisherman because the fisherman can use the sharp edge to cut the line with a blade readily available.

Figure 4:
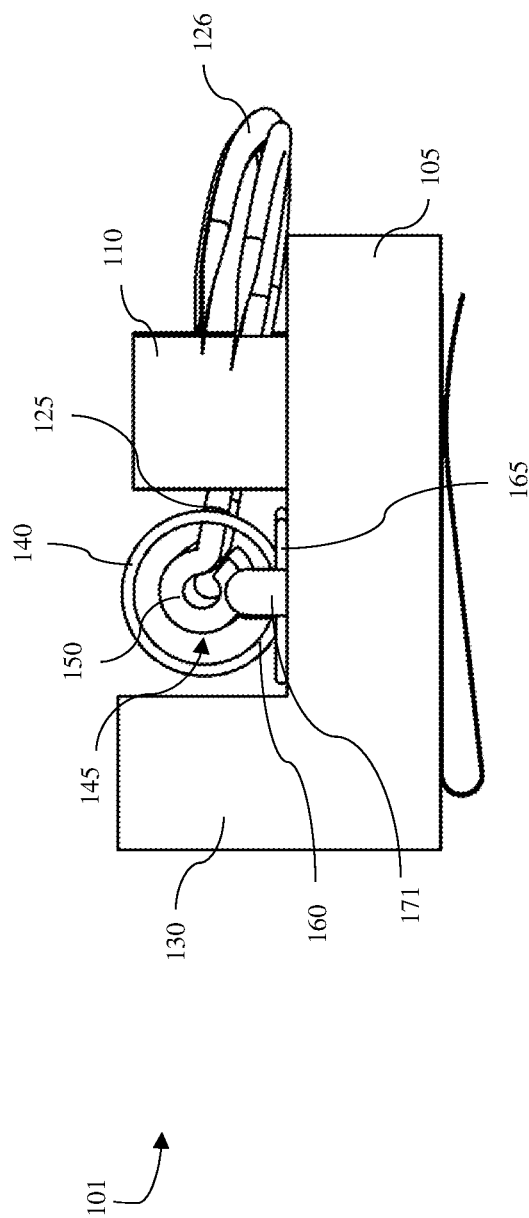
FIG. 4 is a side view of the fishing hook holder, according to the second example embodiment.

Referring now to FIG. 4, a side view of the fishing hook holder is shown, according to an example embodiment. The plurality of slats 110 spaced apart from each other extend upward from the first side of the base. The backstop 130 extends upwards from the upper portion of the base 180. The expansion spring 135 is positioned between the slats and the backstop and in attachment with the base. The channel 145 is defined by the opening inside the coil windings configured to receive an eye of the fishing hook 150.

The slats may be at least as long as half the length of the shank 125 of the fishing hook 126 and at least as tall as the channel diameter. The backstop may also be at least as tall as the diameter of the expansion spring. The channel diameter may be longer than the diameter of the eye of the fishing hook so that the shank of the fishing hook is held by the tension of the coil windings. The first hook is at the first end of the fishing hook attached via fastener 171 to keep the expansion spring in attachment with the first side of the base and in between the backstop and the plurality of slats.

Referring now to FIG. 5A-6B, an attachment element 185 in attachment with a second side 190 of the base 105 will be described. The attachment element 185 is configured to attach the fishing hook holder to at least one of an article of clothing, a fishing rod, a portion of a boat, and a fisherman. The fishing hook holder also includes an attachment element in attachment with a second side of the base and configured for attaching the fishing hook holder to at least one of an article of clothing, a fishing rod, and a portion of a boat. The attachment element includes at least one of a clip element, a suction element, an adhesive element, and a clamp element having an opening sized to a portion of a fishing rod. The attachment element 185 may be in attachment with any portion of the second side of the base via at least one fastener, such as a nail, screw, or adhesive. Other systems and methods of attachment are within the spirit and scope of the disclosure.

Figure 5A:
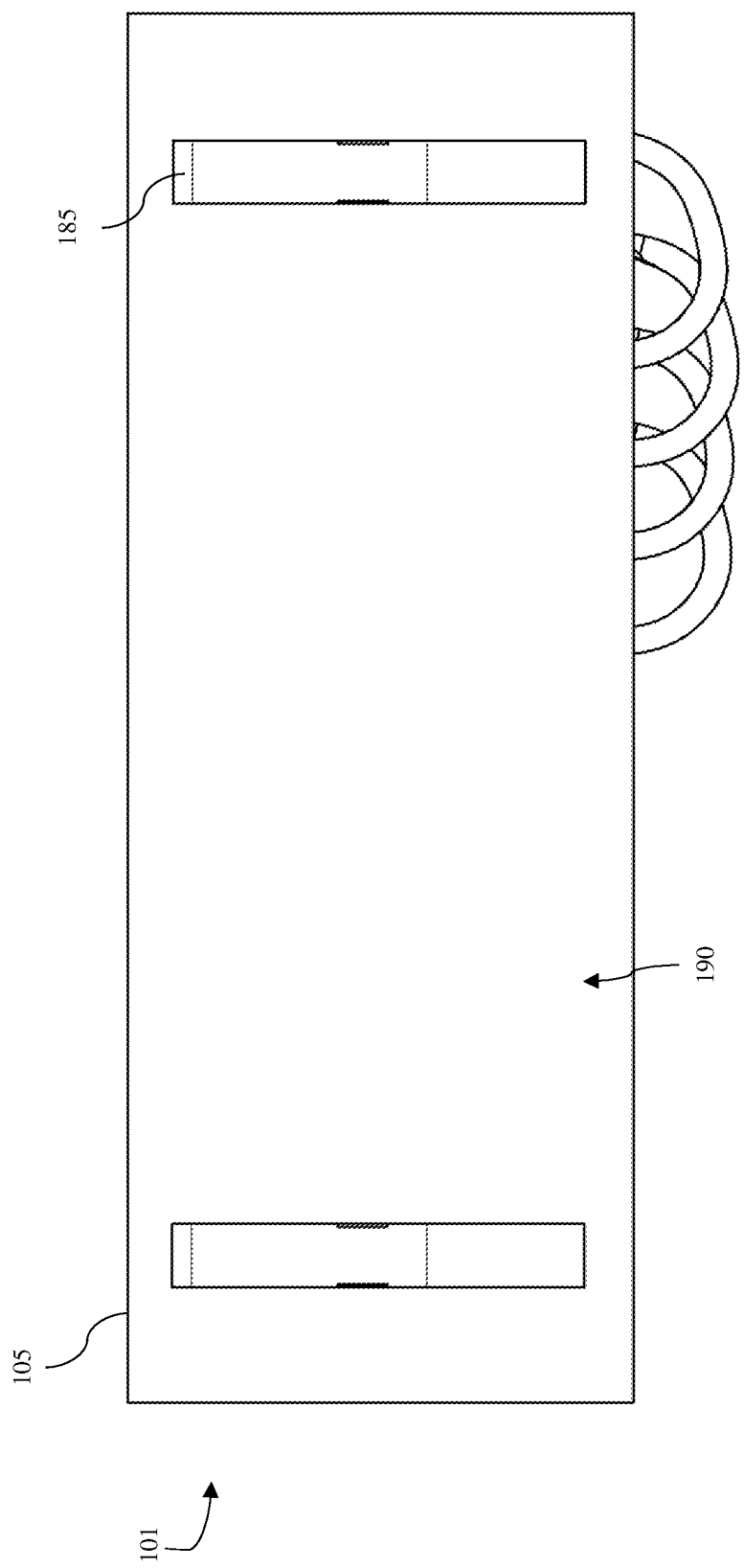
FIG. 5A is a back view of the fishing hook holder, according to the second example embodiment.
Figure 5B:
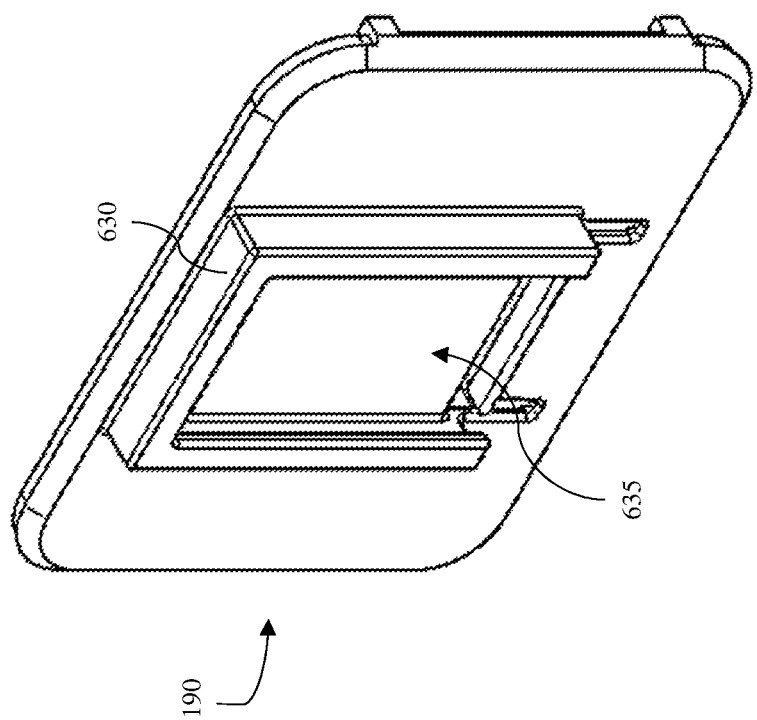
FIG. 5B is a perspective back view of a portion of the fishing hook holder, according to the first example embodiment.
Figure 6A:
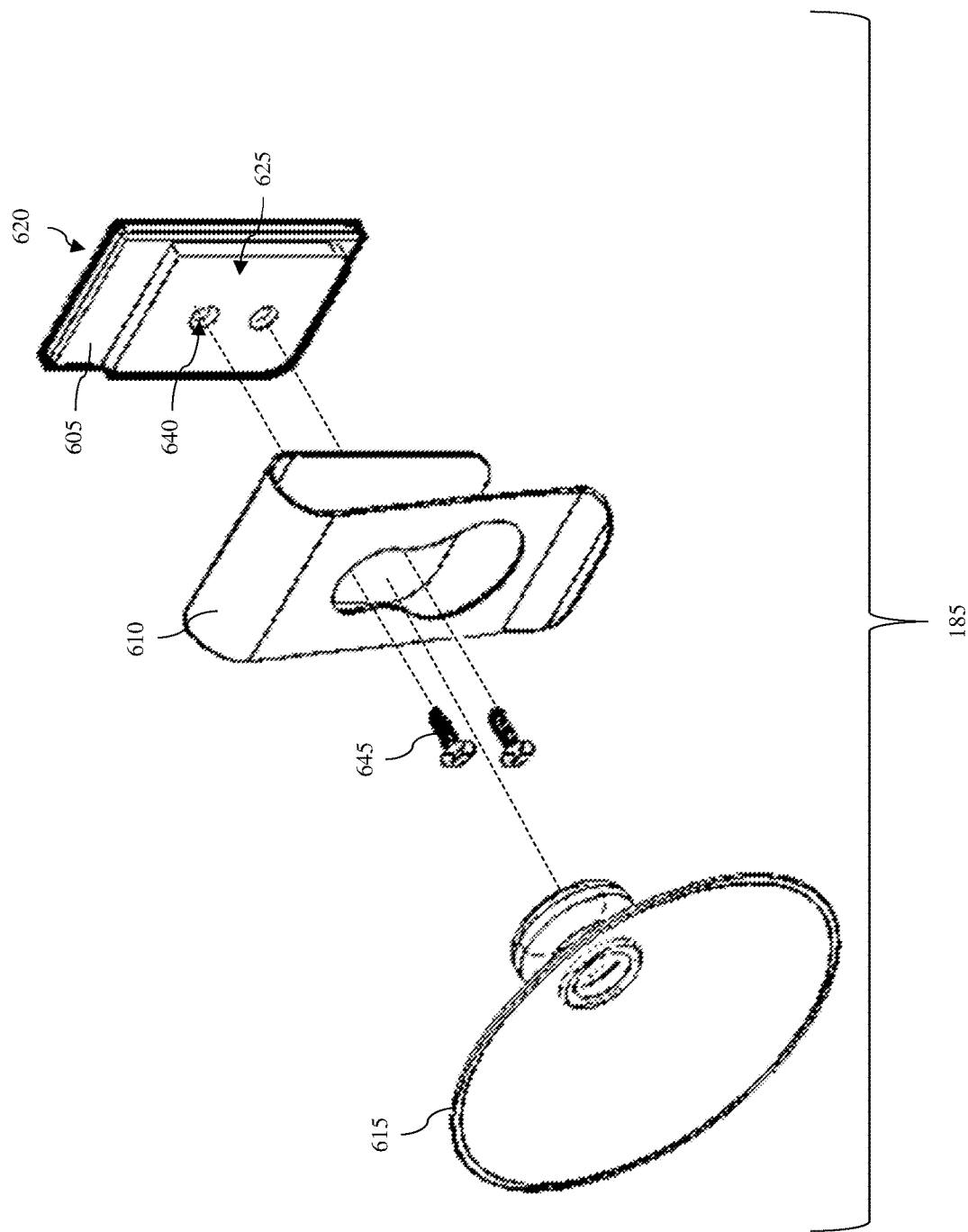
FIG. 6A is an exploded view of an attachment element, according to an example embodiment.
Figure 6B:
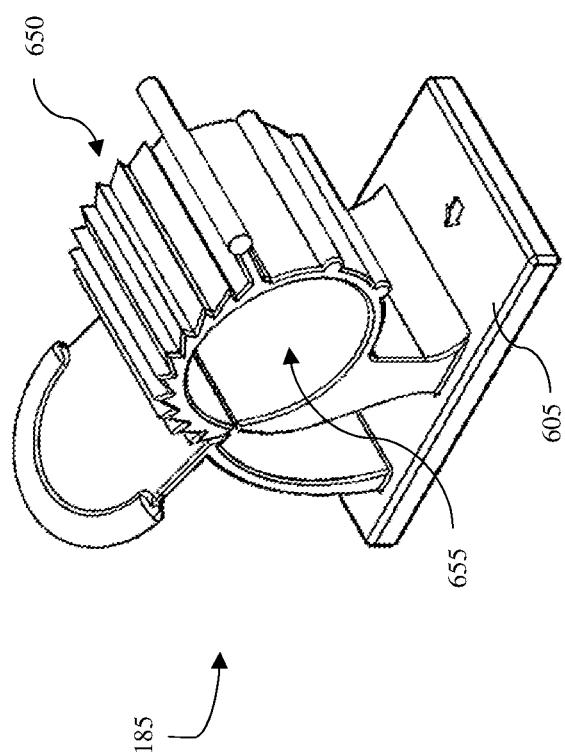
FIG. 6B is a perspective view of an attachment element, according to a second example embodiment.

In certain embodiments as shown in FIGS. 6A and 6B, the attachment element includes an attaching medium 605 in attachment with various parts, such as a clip 610 and/or a suction cup 615. The attachment element is in attachment with the base via the attaching medium, which includes a back side 620 and a front side 625. As shown in FIG. 5B, the second side 190 includes an extruding portion 630 that includes a recess 635. The attaching medium is configured to be received by the extruding portion through the recess. The back side of the attaching medium is attached to the second side of the base by being locked in by the extruding portion, which may include a lip on the edge of the extruding portion or other locking mechanisms configured to maintain attaching medium within the recess of the extruding portion. In other embodiments, the back side of the attaching medium is attached to the second side of the base via an adhesive on the back side or an attaching element, such as a screw for example (not shown). The front side of the attachment element includes openings 640 for receiving fasteners, such as screws 645. The clip is configured to attach to an article of clothing, such as a belt, hat, shirt. The suction cup may be attached to any flat surfaces on boats, such as the gunwale or deck, or tackle boxes, such as the inside of the top cover or anywhere on the outside. The suction cup may be attached to other flat surfaces for the fisherman's convenience.

In some embodiments, the attachment element may include a clamp 650, shown in FIG. 6B, configured to attach to a part of a fishing rod such as the blank of a fishing rod. The clamp includes an opening 655 that receives the part of the fishing rod and is in attachment with the attaching medium 605. In further embodiments, the attachment element a strap configured to secure the fishing hook holder to an extremity of the fisherman, such as a wrist or forearm.

The attachment element may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The attachment element may be made of other materials and is within the spirit and the disclosure. The attachment element may be formed from a single piece or from several individual pieces joined or coupled together. The components of the attachment element may be manufactured from a variety of different processes including an extrusion process, a mold, welding, shearing, punching welding, folding etc. However, other types of processes may also be used and are within the spirit and scope of the present invention. The attachment element allows for a universal portability so that the fisherman may always have the fishing hook holder when necessary.

Figure 7:
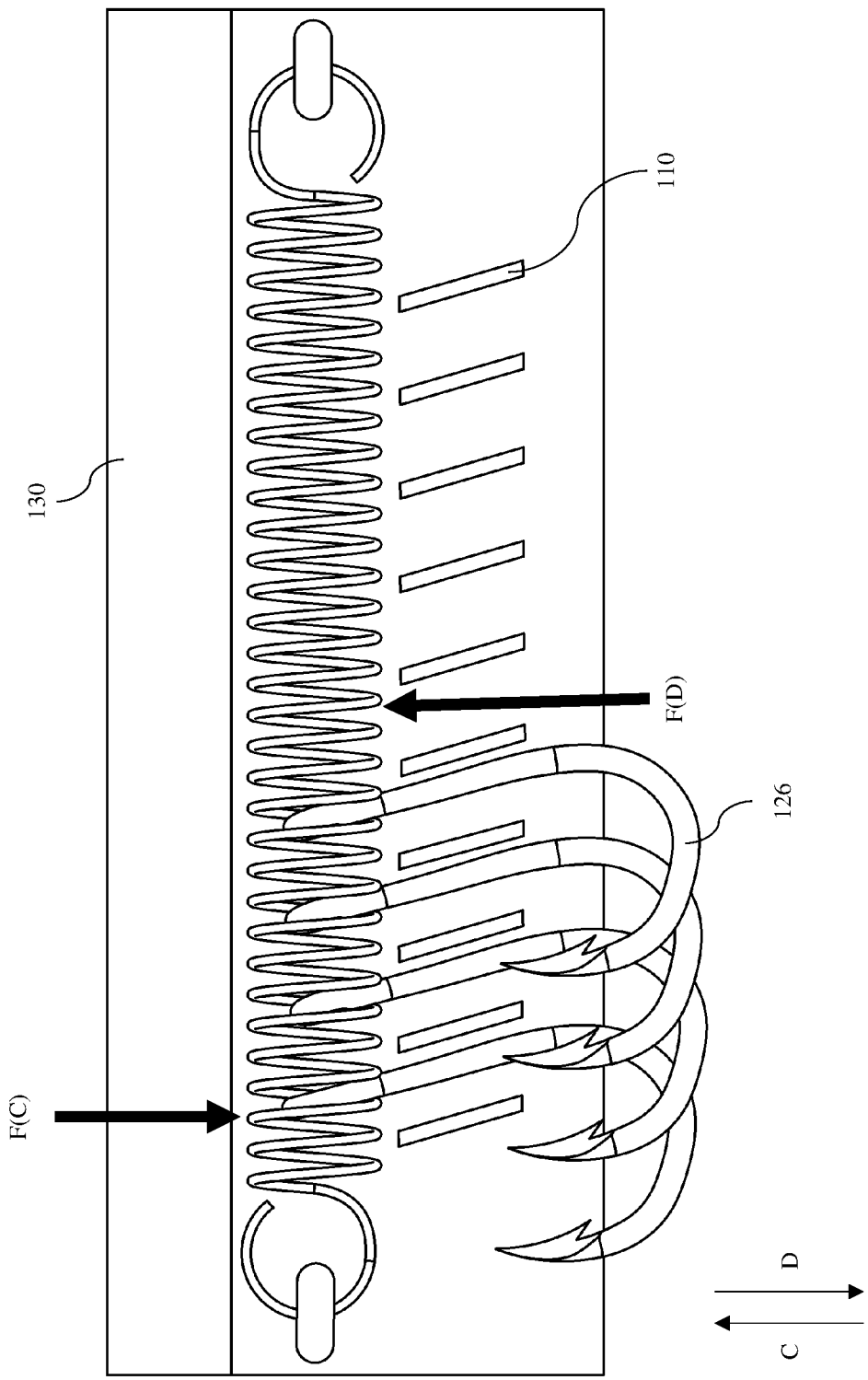
FIG. 7 is a front view of the fishing hook holder illustrating the forces acting on the fishing hook holder as shown by a top view of the fishing hook holder, according to the second example embodiment.
Figure 8:
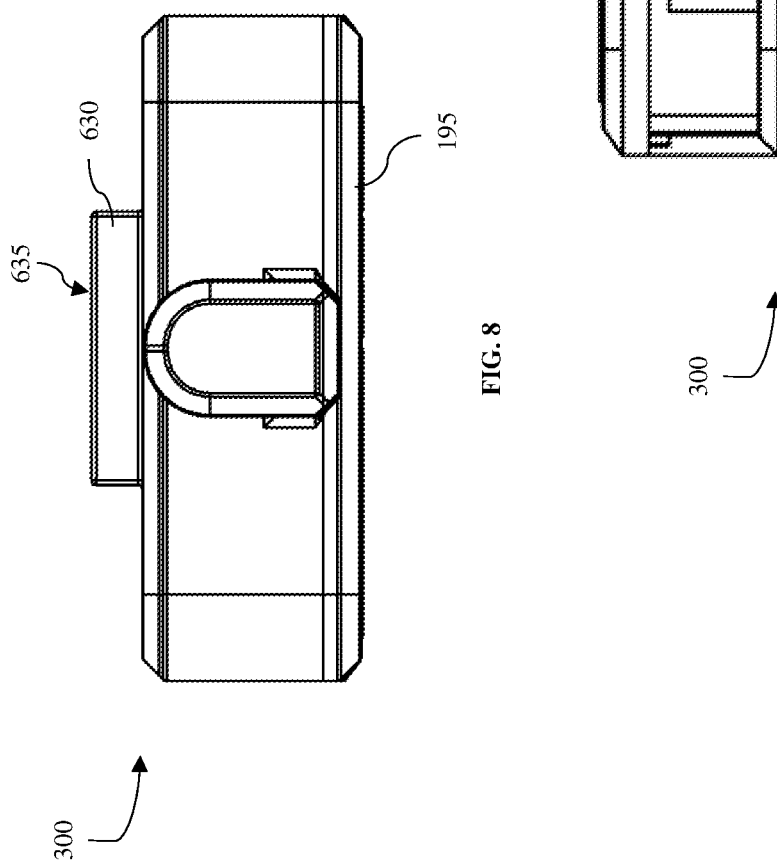
FIG. 8 is a top view of the fishing hook holder, according to the first example embodiment.
Figure 9:
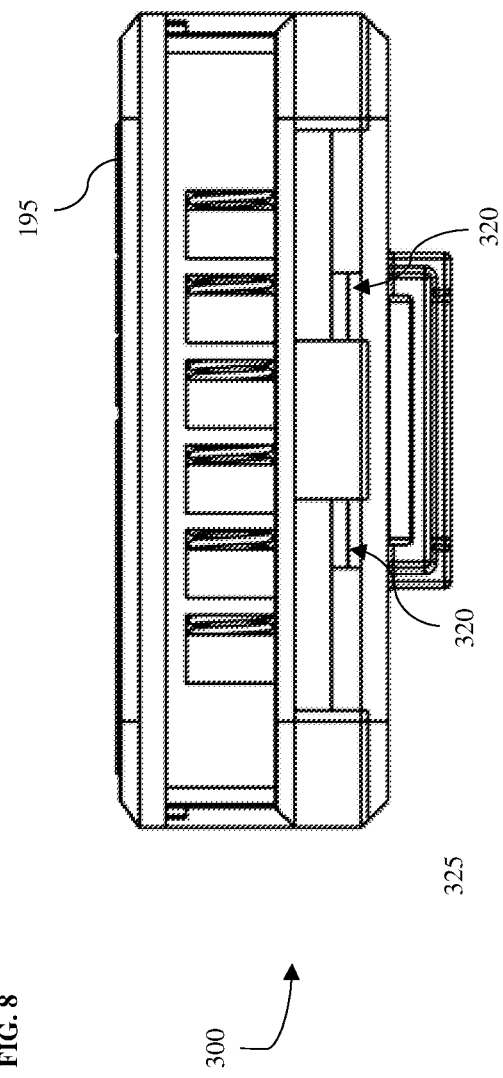
FIG. 9 is a bottom view of the fishing hook holder, according to the first example embodiment.

With reference now to FIG. 7, a diagram of the forces acting on the fishing hook holder 100 as shown by a front view of the fishing hook holder is shown, according to the second example embodiment. The backstop 130 provides a second force F(C) against the spring 135 when the eye of the fishing hook 150 is inserted into the channel 145 of the spring. The plurality of slats 110 provides a third force F(D) against the spring when the eye of the fishing hook is removed from the channel of the spring.

The second force F(C) provided by the backstop acts as a normal force in the direction D against the expansion spring when the eye of the fishing hook is inserted in the C direction through the second gaps. The second force inhibits the spring from moving while the eye of the fishing hook is being fully inserted into the channel such that the biasing element abuts the backstop.

The third force F(D) provided by the plurality of slats also acts as a normal force in the direction C against the expansion spring when the eye of the fishing hook is removed in the direction D from the channel. The third force also inhibits the spring from moving while the eye of the fishing hook is being fully removed through the second gaps.

Figure 11B:
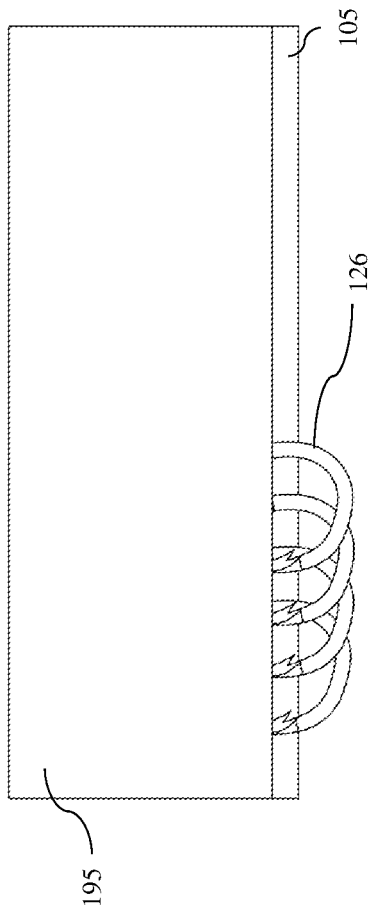
FIG. 11B is a front view of the fishing hook holder having the cover in attachment with an upper portion of the base, according to the second example embodiment.
Figure 11C:
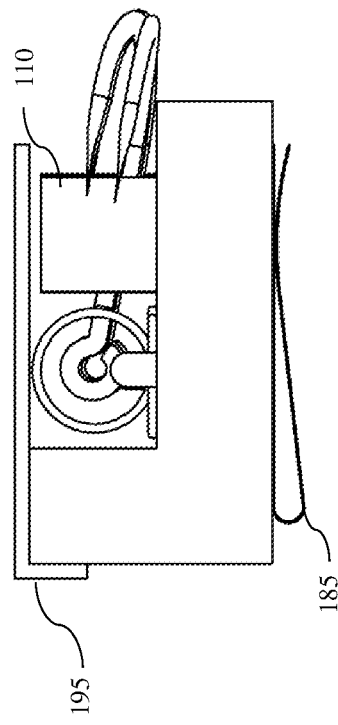
FIG. 11C is a side view of the fishing hook holder having the cover in attachment with an upper portion of the base and illustrating an attachment element, according to the second example embodiment.
Figure 11A:
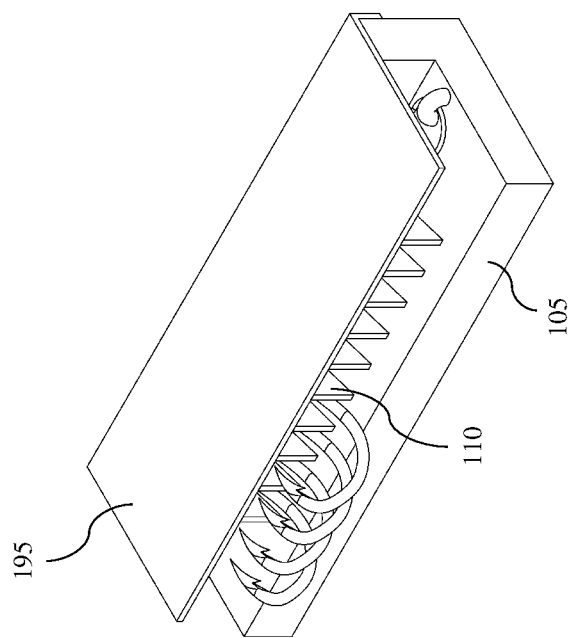
FIG. 11A is a front perspective view of the fishing hook holder having a cover, according to the second example embodiment.

Referring now to FIG. 10A-11C, the fishing hook holder 300 having the cover in attachment with an upper portion of the base is shown, according to example embodiments. FIG. 10A is a perspective view of the first example embodiment of the fishing hook holder, and FIG. 10B is a front view of the first example embodiment fishing hook holder. FIG. 11A is a perspective view of the second example embodiment of the fishing hook holder. FIG. 11B is a front view of the of the second example embodiment fishing hook holder. FIG. 11C is a side view of the of the second example embodiment fishing hook holder.

In the first example embodiment, the cover 195 includes a top portion 1005 and a bottom portion 1010. The top portion of the cover includes hard, resilient material whereas the bottom portion includes soft material, such as silicone. The top portion of the cover may include material such as carbon steel, stainless steel, aluminum, Titanium, other metals or alloys, composites, ceramics, polymeric materials such as polycarbonates like Acrylonitrile butadiene styrene (ABS plastic), Lexan™, and Makrolon™. The top portion of the cover may be made of other materials and is within the spirit and the disclosure. The top portion of the cover may be formed from a single piece or from several individual pieces joined or coupled together. The components of the top portion of the cover may be manufactured from a variety of different processes including an extrusion process, a mold, welding, shearing, punching welding, folding etc. However, other types of processes may also be used and are within the spirit and scope of the present invention. The top portion protects the internal components, such as the biasing element, slats, the first fastener, and the second fastener. The top portion also helps maintain the shank of the fishing hook to stay within the biasing element. The bottom portion of the cover is configured to be flexible yet still resilient against the barb of the fishing hook. The bottom portion prevents the barb of the fishing hook from damaging other items or harming a user of the fishing hook holder. The flexibility of the bottom portion of the cover allows the user's fingers to fit in between the cover and the first side of the base when the user inserts the fishing hooks into the biasing element.

In the second example embodiment, the cover may include material such as carbon steel, stainless steel, aluminum, Titanium, other metals or alloys, composites, ceramics, polymeric materials such as polycarbonates like Acrylonitrile butadiene styrene (ABS plastic), Lexan™, and Makrolon™. The cover may be made of other materials and is within the spirit and the disclosure. The cover may be formed from a single piece or from several individual pieces joined or coupled together. The components of the cover may be manufactured from a variety of different processes including an extrusion process, a mold, welding, shearing, punching welding, folding etc. However, other types of processes may also be used and are within the spirit and scope of the present invention.

The cover may be in attachment with the base during the manufacturing process or coupled to the base after the manufacturing process. The cover protects the expansion spring and a portion of the fishing hooks in the channel A portion of the fishing hooks may include the shank and the barb to protect the fisherman from injury so that the only protruding part of the fishing hook is the bend of the fishing hook.

Figure 12:
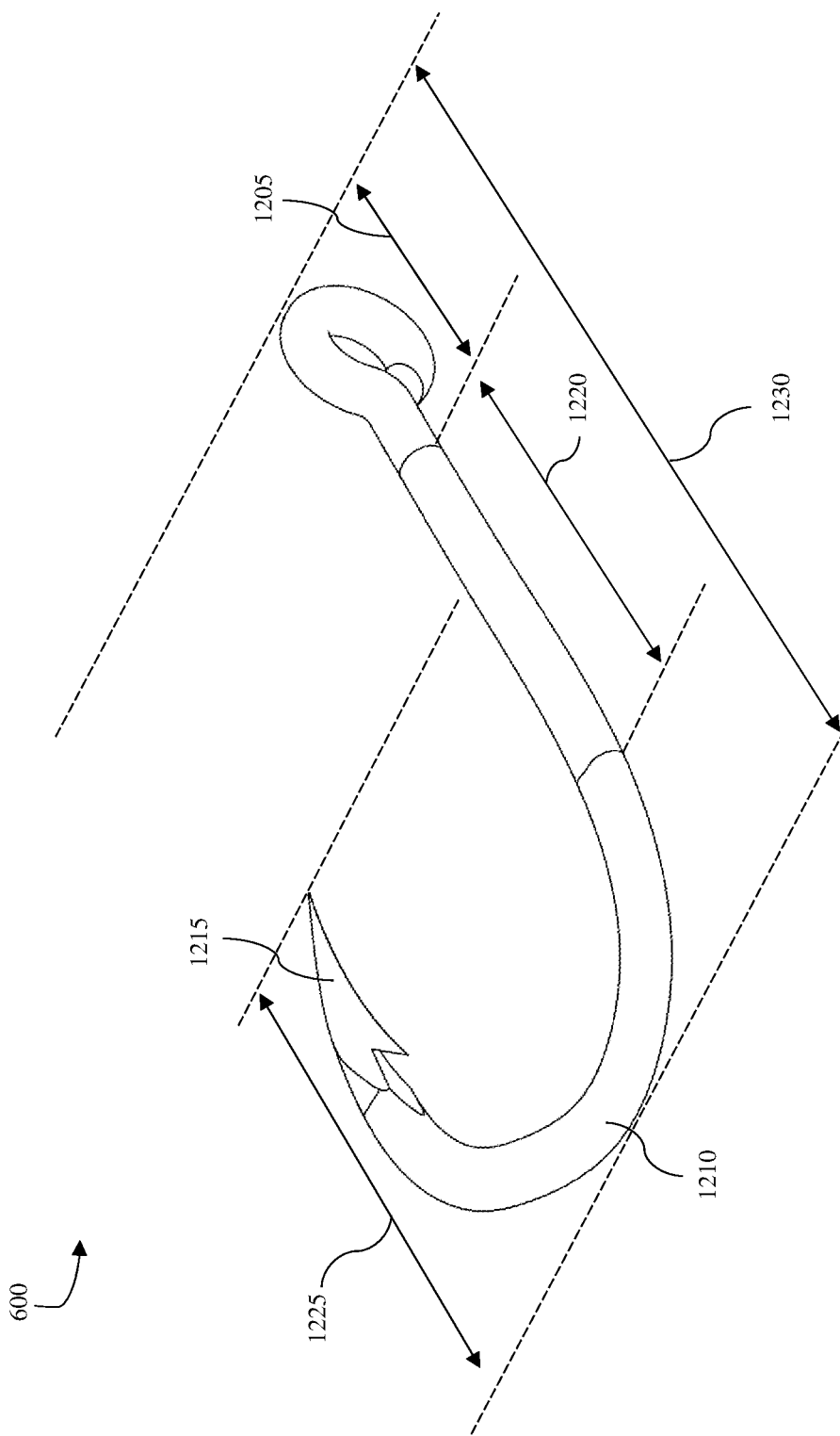
FIG. 12 is a fishing hook, according to an example embodiment.

Referring now to FIG. 12 a fishing hook is shown, according to exemplary embodiments of the present technology. The fishing hook includes a shank 1220, bend 1210, and barb 1215. The shank includes an eye 1205 that would be attached to a fishing line and extends to the bend. The eye of the fishing hook is received into the channel of the spring. The bend of the fishing hook is the curved portion that starts from the shank and ends at the barb. In the present disclosure, the bend extends beyond the bottom edge of the base to allow a fisherman to grab the fishing hook by the bend to insert and remove the fishing hook from the fishing hook holder. The barb is the sharp point at the end of the bend used to penetrate the scales and mouth of a fish to hook the fish onto the line. Because the barb is configured to pierce through skin, the fishing hook holder may include a cover, in certain embodiments, configured to shield a substantial portion of the fishing hook holder. The slats are oriented in the first direction to alight the barbs of each of the fishing hooks in the same first direction. This reduces the risk of injury to the fisherman when retrieving the fishing hook from the fishing hook holder. The cover may hide the barb to prevent the barb from injuring the fisherman when the fisherman is engaging in the rapid dispensing of the fishing hook from the fishing hook holder. The total length 1230 includes the length of the shank and the front length 1225. The length of the shank extends from the top of the eye to the tip of the barb. The front length extends from the tip of the barb to the vertex of the bend.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A fishing hook holder for retaining, storing, and rapidly dispensing a fishing hook, wherein the fishing hook holder comprises:
   a base;
   a plurality of slats spaced apart from each other disposed on a first side of the base;
   a gap formed between adjacent slats of the plurality of slats;
   a biasing element disposed proximate to the plurality of slats; and
   a backstop disposed proximate to the biasing element.

2. The fishing hook holder of claim 1, wherein the plurality of slats is disposed in a first direction.

3. The fishing hook holder of claim 1, the biasing element spring further comprising:
   a plurality of coil windings configured to bias towards each other;
   a channel within the biasing element having a channel diameter; and
   a second gap between each of the plurality of the coil windings, wherein the second gap has a second gap diameter smaller than a shank diameter of a shank of the fishing hook.

4. The fishing hook holder of claim 1, further comprising:
   a first fastener at a first end of the biasing element;
   a second fastener at a second end of the biasing element; and
   wherein the first fastener and the second fastener attach the biasing element to the first side of the base and proximate to the plurality of slats.

5. The fishing hook holder of claim 1, wherein the fishing hook holder further comprises a cover positioned above the biasing element and in attachment with the first side of the base, wherein the cover extends over a substantial portion of the first side.

6. The fishing hook holder of claim 1, further comprising an attachment element in attachment with a second side of the base and attaching the fishing hook holder to at least one of an article of clothing, a fishing rod, a portion of a boat, and a fisherman.

7. The fishing hook holder of claim 1, wherein the fishing hook holder further comprises at least one resilient element disposed in a third side opening on a third side of the base and a fourth side opening on a fourth side of the base such that a portion of the fishing hook holder is sandwiched by the at least one resilient element and an interior portion of the third side opening, and a barb on the fishing hook holder is received by fourth opening.

8. The fishing hook holder of claim 1, wherein the fishing hook holder further comprises a sharp edge for cutting an object.

9. A fishing hook holder for retaining, storing, and rapidly dispensing a fishing hook, wherein the fishing hook holder comprises:
    a base;
    a plurality of slats spaced apart from each other disposed on a first side of the base;
    a gap formed between adjacent slats of the plurality of slats; and
    a biasing element disposed proximate to the plurality of slats, the biasing element comprising:
        a plurality of coil windings configured to bias towards each other;
        a channel within the biasing element having a channel diameter; and
        a second gap between each of the plurality of coil windings.

10. The fishing hook holder of claim 9 further comprising a backstop disposed proximate to the biasing element.

11. The fishing hook holder of claim 9 further comprising a cover positioned above the biasing element and in attachment with the first side of the base, wherein the cover extends over a substantial portion of the first side.

12. The fishing hook holder of claim 9, wherein the fishing hook holder further comprises a first opening on a first side of the base and a second side opening on a second side of the base together configured for retaining a portion of a hook.

13. The fishing hook holder of claim 9, further comprising an attachment element in attachment with a second side of the base and attaching the fishing hook holder to at least one of an article of clothing, a fishing rod, a portion of a boat, and a fisherman.

14. The fishing hook holder of claim 9, wherein the fishing hook holder further comprises a sharp edge for cutting an object.

15. A fishing hook holder for retaining, storing, and rapidly dispensing a fishing hook, wherein the fishing hook holder comprises:
    a base;
    a plurality of slats spaced apart from each other disposed on a first side of the base;
    a gap formed between adjacent slats of the plurality of slats;
    a biasing element disposed proximate to the plurality of slats; and
    a cover positioned above the biasing element and in attachment with the first side of the base, wherein the cover extends over a substantial portion of the first side.

16. The fishing hook holder of claim 15, wherein the biasing element comprises:
    a plurality of coil windings configured to bias towards each other;
    a channel within the biasing element having a channel diameter; and
    a second gap between each of the plurality of coil windings.

17. The fishing hook holder of claim 15 further comprising a backstop disposed proximate to the biasing element.

18. The fishing hook holder of claim 15, wherein the fishing hook holder further comprises a first opening on a first side of the base and a second side opening on a second side of the base together configured for retaining a portion of a hook.

19. The fishing hook holder of claim 15, further comprising an attachment element in attachment with a second side of the base and attaching the fishing hook holder to at least one of an article of clothing, a fishing rod, a portion of a boat, and a fisherman.

20. The fishing hook holder of claim 15, wherein the fishing hook holder further comprises a sharp edge for cutting an object.

\* \* \* \* \*